(12) United States Patent
Boissonneault et al.

(10) Patent No.: US 6,779,193 B2
(45) Date of Patent: Aug. 17, 2004

(54) DIGITAL DATA STORAGE ASSEMBLY WITH PARTICULAR HUB ADAPTOR

(75) Inventors: Ronald A. Boissonneault, Imperial, PA (US); Ramesh M. Pisipati, Wexford, PA (US); Anthony L. Gelardi, Cape Porpoise, ME (US); Tatiana L. Gelardi, Kennebunkport, ME (US)

(73) Assignee: Bayer Polymers LLC, Pittsburgh, PA (US)

( * ) Notice: Subject to any disclaimer, the term of this patent is extended or adjusted under 35 U.S.C. 154(b) by 93 days.

(21) Appl. No.: 10/281,703

(22) Filed: Oct. 28, 2002

(65) Prior Publication Data

US 2004/0081072 A1 Apr. 29, 2004

(51) Int. Cl.⁷ ............................................. G11B 23/38
(52) U.S. Cl. ...................................... 720/720; 720/724
(58) Field of Search ................................. 369/280, 289; 720/721, 720, 724

(56) References Cited

U.S. PATENT DOCUMENTS

| | | | |
|---|---|---|---|
| 2,416,135 A | 2/1947 | Appleby | 274/5 |
| 3,825,323 A | 7/1974 | Landwer | 350/255 |
| 4,060,248 A | 11/1977 | Lakerveld et al. | 274/41.6 R |
| 4,335,173 A | 6/1982 | Caraballo | 428/65 |
| 4,447,899 A | 5/1984 | Geyer et al. | 369/111 |

(List continued on next page.)

FOREIGN PATENT DOCUMENTS

| | | |
|---|---|---|
| DE | 202 11 246 U | 11/2002 |
| EP | 288 580 | 11/1988 |
| EP | 736 874 | 10/1996 |
| GB | 2 059 666 | 4/1981 |
| JP | 58-211327 | * 12/1983 |
| WO | 01/07240 | 2/2001 |
| WO | 02/18491 | 3/2002 |

OTHER PUBLICATIONS

Patent Absracts of Japan vol. 0132, No. 10 (P–872), May 17, 1989 & JP 01 027085 A (Pioneer Electronic Corp), Jan. 30, 1989.

Patent Abstracts of Japan vol. 0133, No. 37 (P–906), Jul. 28, 1989 & JP 01 096862 A (Dainippon Printing Co Ltd), Apr. 14, 1989.

*Primary Examiner*—Brian E. Miller
(74) *Attorney, Agent, or Firm*—Joseph C. Gil; James R. Franks (57) ABSTRACT

A digital data storage assembly (2), e.g., a flexible thin film compact disc, is described. Digital data storage assembly (2) includes, (a) a thin film data storage carrier (11), having substantially opposed first (14) and second (17) surfaces, an aperture (20), and at least one tab (23, 26) extending partially into aperture (20). The assembly (2) also includes, (b) a rigid support (29) having substantially opposed first (32) and second (35) surfaces, and an aperture (38). The assembly (2) further includes, (c) a locking device (41) positioned at least partially around aperture (38) of rigid support (29). Locking device (41) includes at least one shelf (44, 47) extending out over a portion of the first surface (32) of rigid support (29). The shelf (e.g., 44) and a portion (e.g., 53) of the first surface (32) of rigid support (29) residing thereunder together define a tapered slot (e.g., 62), having an open end (59) and a closed end (56). The second surface (17) of thin film data storage carrier (11) abuts at least a portion of the first surface (32) of rigid support (29). The aperture (20) of data storage carrier (11), and the aperture (38) of rigid support (29) are substantially aligned. Thin film data storage carrier (11) is reversibly fixed to rigid support (29) by means of the tab (e.g., 23 and 26) of data storage carrier (11) being reversibly received within the tapered slot (e.g., 62 and 62'). Also described is a thin film data storage carrier support (5), and a thin film data storage carrier having a cruciform aperture (91, 114) therein.

27 Claims, 10 Drawing Sheets

U.S. PATENT DOCUMENTS

| | | | |
|---|---|---|---|
| 4,710,913 A | * 12/1987 | Matsushima et al. | 369/280 |
| 4,827,469 A | * 5/1989 | Peeters | 369/280 |
| 4,836,875 A | 6/1989 | Foster | 156/209 |
| 4,965,118 A | 10/1990 | Kodera et al. | 428/137 |
| 5,265,086 A | * 11/1993 | Ota et al. | 369/284 |
| 5,579,296 A | 11/1996 | Smith et al. | 369/273 |
| 5,724,209 A | * 3/1998 | Dunckley et al. | 360/98.08 |
| 5,869,163 A | 2/1999 | Smith et al. | 428/64.1 |
| 6,196,059 B1 | * 3/2001 | Kosslinger et al. | 73/61.49 |
| 6,404,730 B2 | * 6/2002 | Yeo et al. | 369/281 |

* cited by examiner

DIGITAL DATA STORAGE ASSEMBLY WITH PARTICULAR HUB ADAPTOR

DESCRIPTION OF THE INVENTION

The present invention relates to a digital data storage assembly that includes a thin film data storage carrier having an aperture, a rigid support having an aperture, and a locking device positioned at least partially around the aperture of the rigid support. The locking device includes at least one shelf that extends out over the upper surface of the rigid support, and the two together define a tapered slot having an open end and a closed end. The thin film data storage carrier has at least one tab that extends partially into the aperture thereof, and is preferably optically readable, e.g., a thin film compact disc. The thin film data storage carrier is reversibly fixed to the rigid support by means of the tab being reversibly received and fixed within the tapered slot (e.g., by means of rotating the thin film data storage carrier around the locking device).

Data storage carriers include those that are optically readable, such as compact discs, rewritable compact discs, video discs and DVD discs. Optically readable data storage carriers, such as compact discs, are typically rigid and are fabricated by processes that include a thermoplastic injection molding step. The injection molding step typically limits the number of units that can be prepared in a given amount of time. In addition, rigid optically readable data storage carriers, such as rigid compact discs, have space and storage configuration requirements that can limit marketing and transport thereof. For example, rigid compact discs must be physically stored and transported in such a way as to minimize bending, which can result in cracking or catastrophic breakage of the discs.

More recently, thin film data storage carriers have been developed, such as thin film flexible compact discs, that combine the advantages of rigid compact discs (e.g., high data storage capacity) with improved physical storage and transport capabilities. The production rates of thin film flexible data storage carriers are generally greater than those of rigid data storage carriers. Typically, thin film flexible data storage carriers can be prepared in the absence of a limiting injection molding step, e.g., by means of cutting data-embossed thin film flexible discs out of a sheet of thermoplastic material.

Thin film flexible data storage carriers typically must be further supported, for example by means of a rigid adapter or lens, if used in an optical digital accessing apparatus originally adapted for use with rigid carriers, such as rigid compact discs. Rigid adapters developed thus far, typically are complicated to use and/or do not adequately reversibly fix the thin film data carrier in place. Reversibly fixing the thin film data carrier to the rigid adapter allows for ease of switching thin film data carriers, and adequately holding the thin film data carrier in place during its use within an optical digital accessing apparatus, e.g., a compact disc player.

It is desirable to further develop thin film data storage assemblies that provide ease of use. In addition, it would be desirable that such newly developed thin film data storage assemblies include a rigid adapter to which the thin film data carrier, e.g., a thin film flexible compact disc, can be reversibly fixed.

U.S. Pat. Nos. 5,579,296 and 5,869,163 disclose a thin film data storage medium that includes a thin film data carrier, and a reusable adapter that temporally receives and supports the thin film data carrier. The adapter may include a rotational locking mechanism having a slot with an end for receiving a tab of the thin film data carrier.

In accordance with the present invention, there is provided a digital data storage assembly comprising:
(a) a thin film data storage carrier, having substantially opposed first and second surfaces, i.e., substantially parallel first and second surfaces, having an aperture, and having at least one tab extending partially into said aperture;
(b) a rigid support having substantially opposed first and second surfaces, i.e., substantially parallel first and second surfaces, and having an aperture; and
(c) a locking device positioned at least partially around said aperture of said rigid support, said locking device comprising at least one shelf extending out over a portion of the first surface of said rigid support, said shelf having an upper surface and a lower surface, a portion of the first surface of said rigid support residing under said shelf, the lower surface of said shelf and said portion of said first surface of said rigid support residing under said shelf together defining a tapered slot dimensioned to reversibly receive and reversibly fix the tab of said thin film data storage carrier, said tapered slot having an open end and a closed end,
wherein the second surface of said thin film data storage carrier abuts at least a portion of the first surface of said rigid support, the aperture of said thin film data storage carrier (a), and the aperture of said rigid support (b) are substantially aligned, and said thin film data storage carrier is reversibly fixed to said rigid support by means of the tab of said thin film data storage carrier being reversibly received within said tapered slot.

In further accordance with the present invention, there is provided a thin film data storage carrier support comprising:
(i) a rigid support having substantially opposed first and second surfaces, and having an aperture; and
(ii) a locking device positioned at least partially around said aperture of said rigid support, said locking device comprising at least one shelf extending out over a portion of the first surface of said rigid support, said shelf having an upper surface and a lower surface, a portion of the first surface of said rigid support residing under said shelf, the lower surface of said shelf and said portion of said first surface of said rigid support residing under said shelf together defining a tapered slot, said tapered slot having an open end and a closed end,
wherein said tapered slot is dimensioned to reversibly receive and reversibly fix a tab of a thin film data storage carrier as described above, and thereby allow the thin film data storage carrier to be reversibly fixed to the rigid support of the thin film data storage carrier support.

In accordance with the present invention, there is also provided a thin film data storage carrier having a cruciform aperture therein.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings.

Unless otherwise indicated, all numbers or expressions, such as those expressing structural dimensions, process conditions, etc. used in the specification and claims are understood as modified in all instances by the term "about."

In FIGS. 1 through 12, like reference numerals and characters designate the same components and structural features.

DETAILED DESCRIPTION OF THE INVENTION

Figure 1:
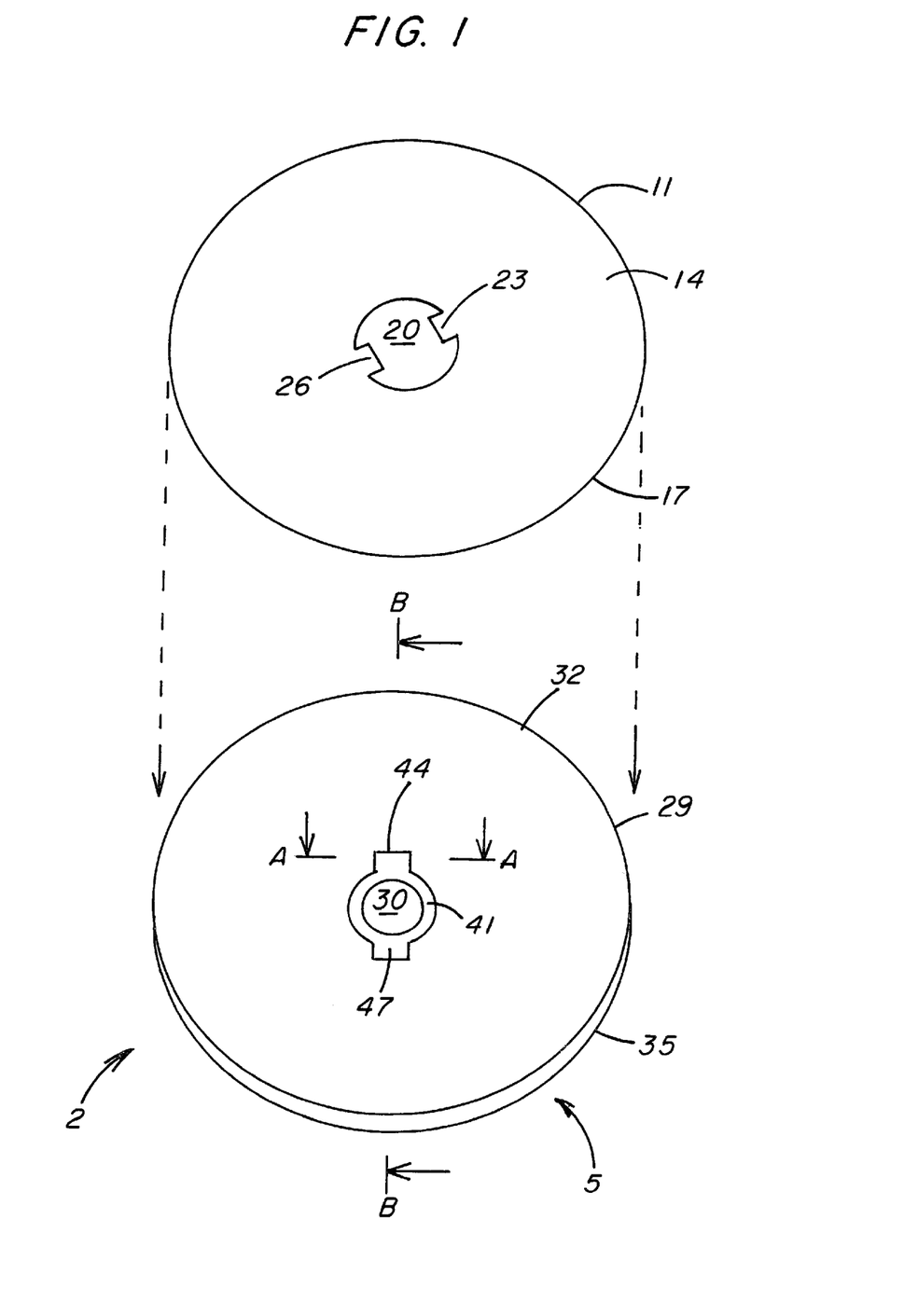
FIG. 1 is a representative exploded view of a digital data storage assembly according to the present invention.

Referring now to FIG. 1 of the drawing figures, there is shown an exploded perspective view of a digital data storage assembly 2 according to the present invention. Assembly 2 includes a thin film data storage carrier 11. Carrier 11 has substantially opposed first 14 and second 17 surfaces and an aperture 20. Second surface 17 is not directly visible in FIG. 1. First 14 and second 17 surfaces can also be described as being substantially parallel surfaces. Aperture 20 may be located anywhere in data carrier 11. However, aperture 20 is preferably located or positioned in a central region of data carrier 11, e.g., in the area of the center of gravity of data carrier 11. More preferably, the center of gravity of data carrier 11 is located in the center of aperture 20.

Data carrier 11 also includes at least one tab, 23 and 26, that extends partially into aperture 20. As used herein and in the claims, by "extends partially into aperture 20" is meant that tabs 23 and 26 do not, either separately or together, extend all the way across aperture 20. Tabs 23 and 26 may be continuous with the material of data carrier 11, or alternatively may be separately adhered thereto, e.g., by means of adhesives, as is known to the skilled artisan. Preferably, tabs 23 and 26 are continuous with the material of data carrier 11.

Figure 7:
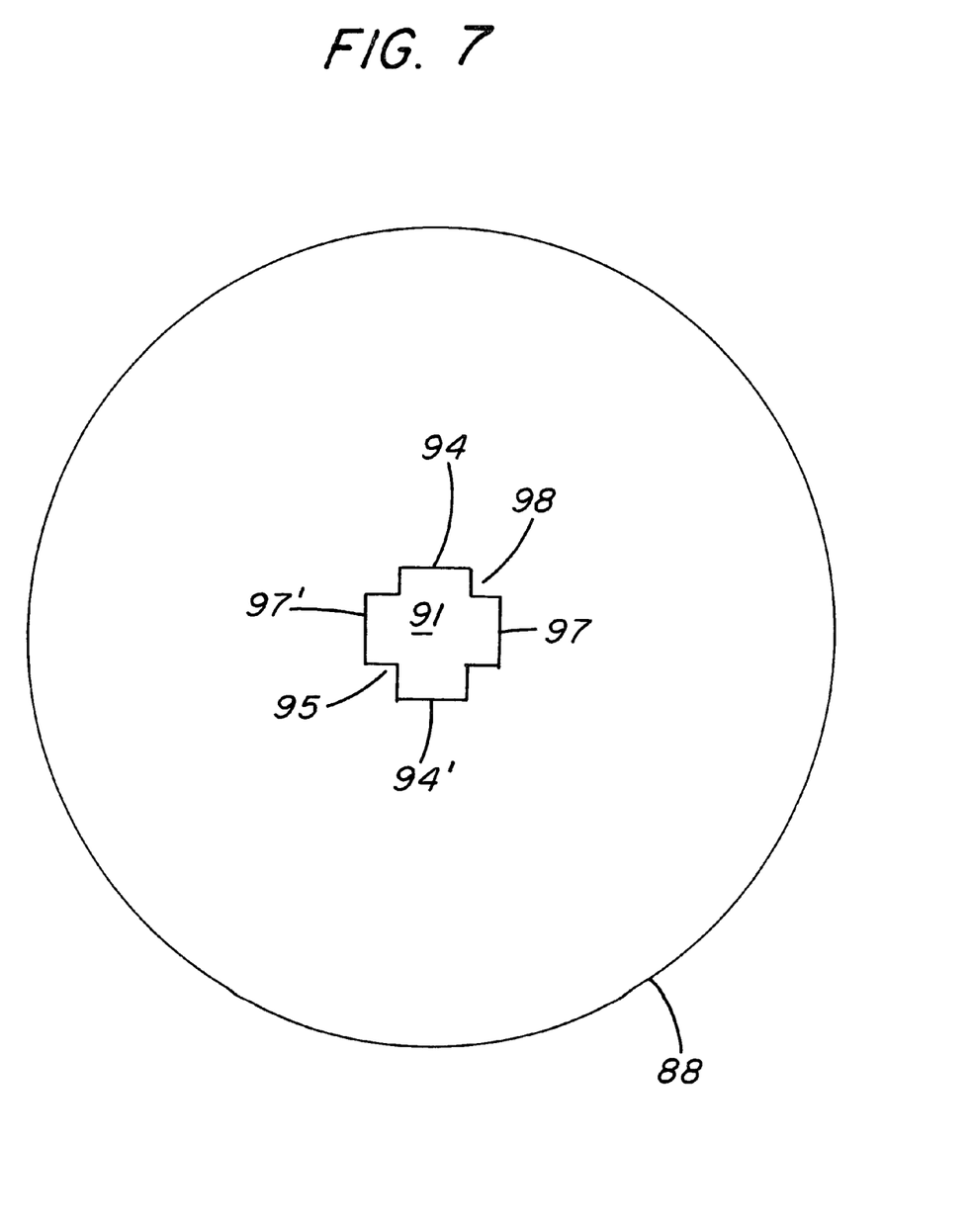
FIG. 7 is a representative top-down view of a thin film data storage carrier according to the present invention, having a cruciform aperture therein.

The aperture of the thin film data storage carrier may be of any suitable configuration, examples of which include, but are not limited to substantially circular, elliptical, triangular, square, rectangular, hexagonal, cruciform and irregular. In an embodiment of the present invention, the aperture of the thin film data storage carrier is cruciform. With reference to FIG. 7, thin film data storage carrier 88, has a cruciform aperture 91 therein. Aperture 91 is defined in part by two pairs of substantially opposed and substantially straight sides or edges (terminal sides or edges), 94 and 94', and 97 and 97'. Data storage carrier 88 also has two tabs 98 and 95 that each extend partially into aperture 91.

Figure 8:
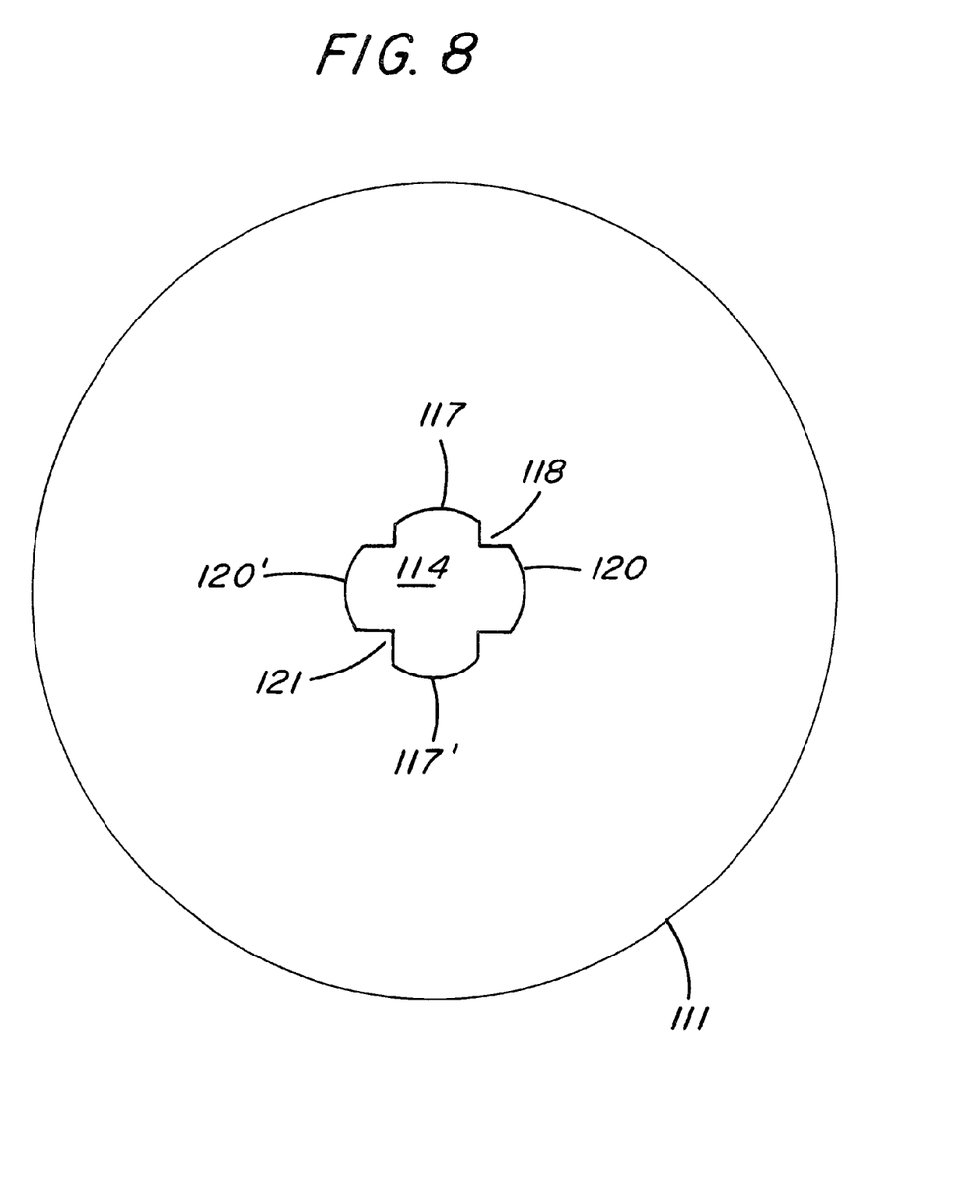
FIG. 8 is a representative top-down view of a thin film data storage carrier according to the present invention, having a cruciform aperture that is defined by two pairs of opposed arcuate sides.

In a further embodiment of the present invention, the thin film data storage carrier has a cruciform aperture that is defined in part by two pairs of substantially opposed and substantially arcuate sides. With reference to FIG. 8, data storage carrier 111 has an cruciform aperture 114, which is defined in part by two pairs of substantially opposed arcuate sides or edges (e.g., terminal sides or edges), 117 and 117', and 120 and 120'. Data storage carrier 111 also includes two tabs 118 and 121 that each extend partially into aperture 114.

Figure 5:
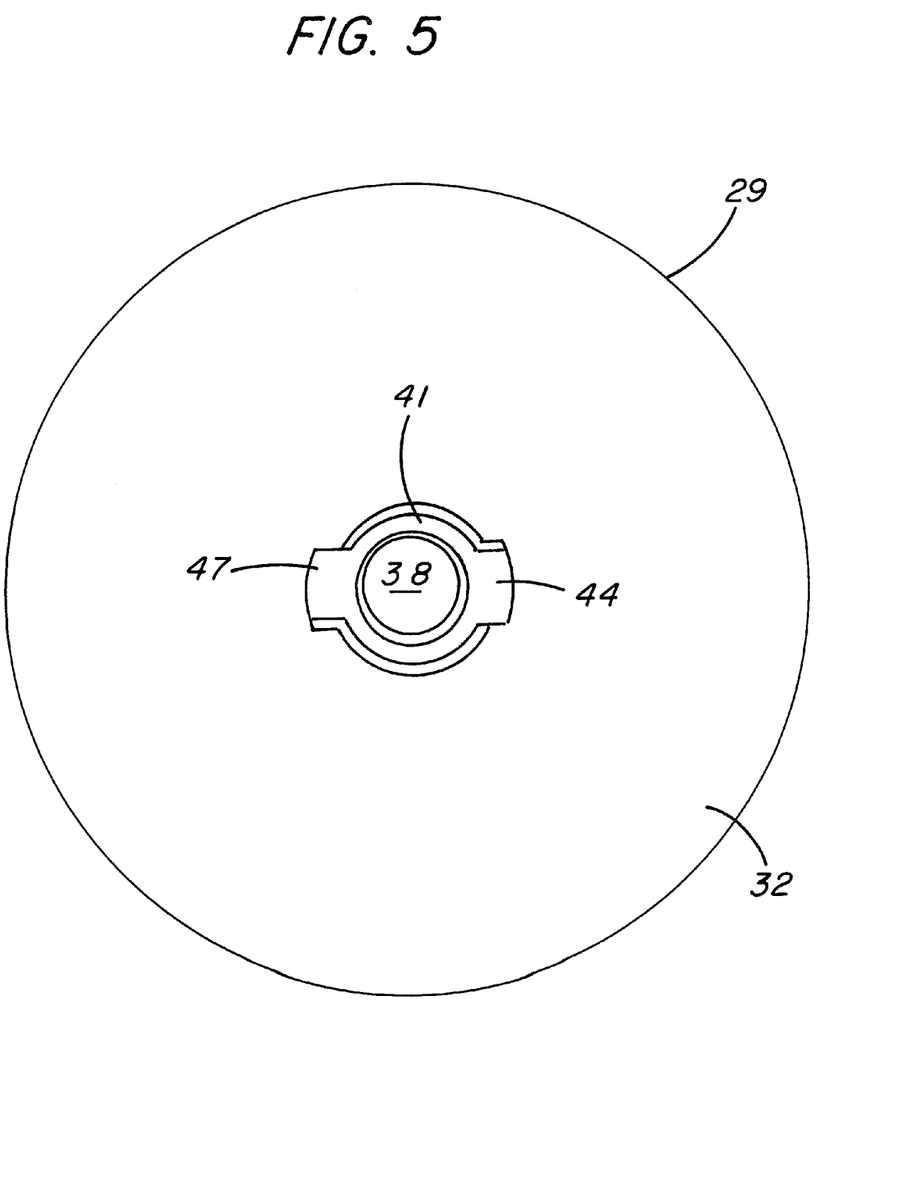
FIG. 5 is a representative top-down view of a rigid support including a locking device according to the present invention.

Data storage assembly 2 also includes a rigid support 29 having substantially opposed first 32 and second 35 surfaces, and an aperture 38. In FIG. 1, second surface 35 is not directly visible. First 32 and second 35 surfaces can also be described as being substantially parallel surfaces. Rigid support 29 also includes a locking device 41 that is positioned at least partially around aperture 38. A representative top-down view of rigid support 29 is shown in FIG. 5.

Figure 2:
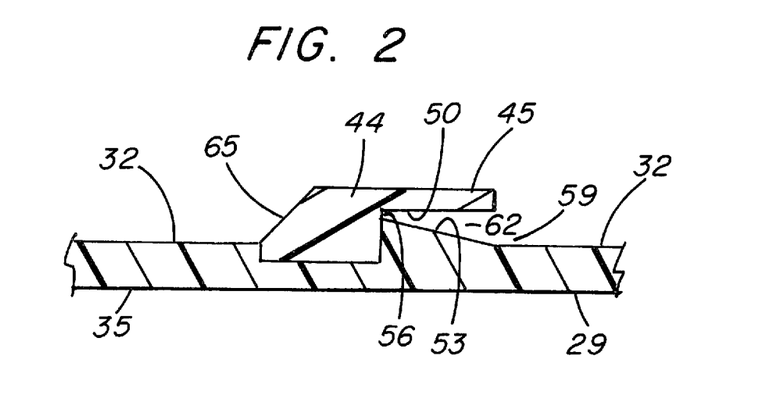
FIG. 2 is a representative section of the shelf of the locking device of FIG. 1, along line A—A.

Locking device 41 includes at least one shelf (44, 47). With reference to FIG. 2, shelf 44 has an upper surface 45 and a lower surface 50. A portion 53 of first surface 32 of rigid support 29 resides under shelf 44. Lower surface 50 of shelf 44 and that portion 53 of first surface 32 that resides under shelf 44 together define a tapered slot 62. Tapered slot 62 has an open end 59 and a closed end 56.

Aperture 38 may be located anywhere in rigid support 29. However, aperture 38 is preferably located or positioned in a central region of rigid support 29, e.g., in the area of the center of gravity of rigid support 29. More preferably, the center of gravity of rigid support 29 is located in the center of aperture 38. The aperture of the rigid support may be of any suitable configuration, examples of which include, but are not limited to substantially circular, elliptical, triangular, square, rectangular, hexagonal, cruciform and irregular. In a preferred embodiment of the present invention, the aperture of the rigid support is substantially circular.

When data storage assembly 2 is assembled, second surface 17 of data storage carrier 11 abuts at least a portion of first surface 32 of rigid support 29. Aperture 20 of data carrier 11 and aperture 38 of rigid support 29 are substantially aligned. Thin film data storage carrier 11 is reversibly fixed to rigid support 29 by means of tabs 23 and 26 being reversibly received within the tapered slots (62 and 62' of FIG. 3) of shelves 44 and 47. For example, tab 23 is reversibly received within tapered slot 62. In particular, second surface 17 of data storage carrier 11 is placed in abutment with first surface 32 of rigid support 29, such that apertures 20 and 38 are substantially aligned. Data storage carrier 11 is then rotated, either clockwise or counter clockwise (depending on the location of openings 59 and 59' of slots 62 and 62', see FIG. 3), around locking device 41 such that the tabs, e.g., tab 44, enter an open end of one of the slots of shelves 44 and 47, e.g., opening 59 of tapered slot 62 under shelf 44. As the tab is moved further into tapered slot 62, at least a portion of the tab becomes wedged therein.

Depending on the dimension of the tapered slot, e.g., slot 62, and the thickness of data storage carrier 11, the tab may also abut against closed end 56 of tapered slot 62. Closed end 56 of tapered slot 62 may be flat, as is the case in FIG. 2, or may be a point, not shown (e.g., the tapered slot forming a triangle in cross section).

In an embodiment of the present invention, aperture 38 of rigid support 29 is substantially circular, the shelf, e.g., shelf 44, is an annular shelf, and the tapered slot, e.g., slot 62, is an annular tapered slot. With reference FIG. 3, a representative top-down view of locking device 41 is shown, in which annular tapered slots 62 and 62' of annular shelves 44 and 47 are shown by means of dashed lines. With reference to FIG. 4, a representative perspective view of locking device 41 is shown alone, without rigid support 29 thereunder. In FIG. 4, annular tapered slot 62, opening 59, closed end 56 are viewable. In addition, in FIG. 4, locking device 41 has an aperture 39.

In an embodiment of the present invention, and with reference to FIG. 2, tapered slot 62 is defined by lower surface 50 of shelf 44 being substantially planar, and portion 53 (of first surface 32 of rigid support 29 residing under shelf 44) being angled (or ramped) up towards lower surface 50 of shelf 44.

Figure 9:
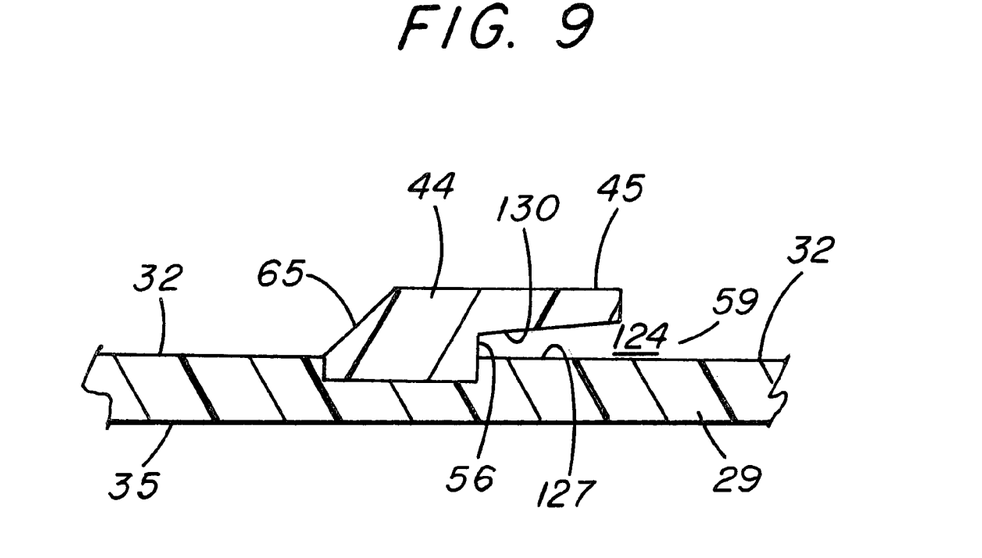
FIG. 9 is a representative section of a locking device similar to that of FIG. 2, but wherein the lower surface of the shelf is angled down towards that portion of the horizontal first surface of the rigid support residing thereunder.

In a further embodiment of the present invention, and with reference to FIG. 9, tapered slot 124 is defined by the lower surface 130 of shelf 44 being angled (or ramped) down towards portion 127 of first surface 32 of rigid support 29 residing under shelf 44. Portion 127 residing under shelf 44 is substantially planar.

Figure 10:
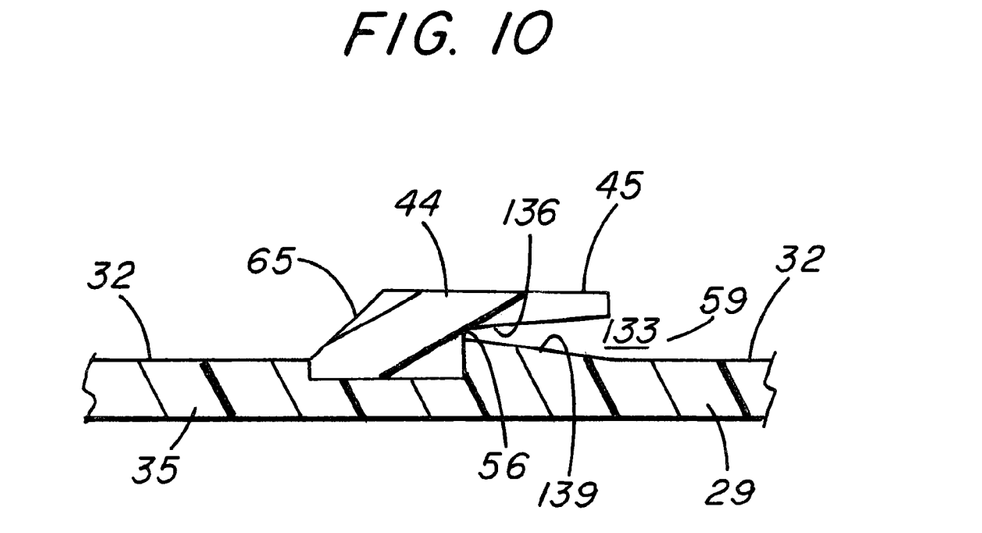
FIG. 10 is a representative section of a locking device similar to that of FIG. 2, but wherein each of the lower surface of the shelf and that portion of the first surface of the rigid support residing thereunder are angled down and up respectively towards each other.

In another embodiment of the present invention, and with reference to FIG. 10, tapered slot 133 is defined by lower surface 136 of shelf 44 being angled down towards portion 139 of first surface 32 of rigid support 29 residing under shelf 44, and portion 139 of first surface 32 of rigid support 29 residing under shelf 44 is angled up towards lower surface 136 of shelf 44.

Figure 11:
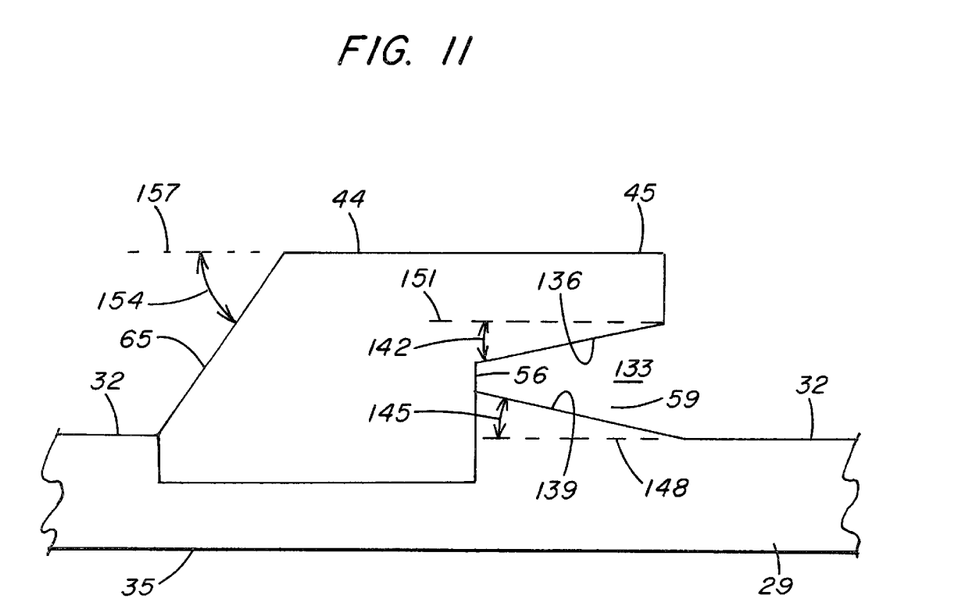
FIG. 11 is a representative section of the locking device depicted in FIG. 10, with angles of the lower surface of the shelf, the surface residing thereunder and the ramped side being further illustrated.
Figure 12:
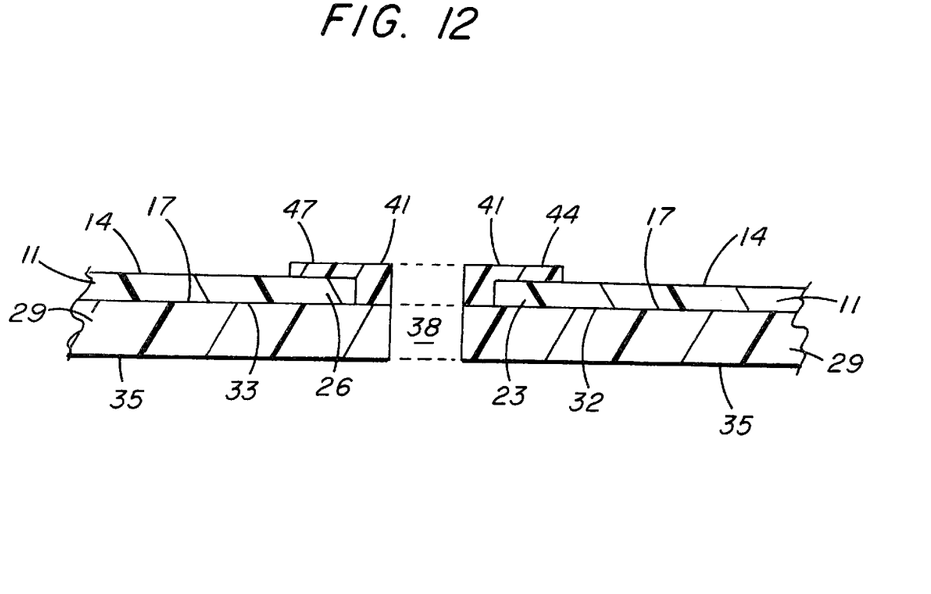
FIG. 12 is a representative sectional view of the data storage assembly of FIG. 1 along line B—B, in which the data storage assembly is assembled (rather than exploded).

With regard to the lower surface of the shelf of the locking device, the term "angled down" means the angle of departure of the lower surface from the horizontal. With reference to FIG. 11, lower surface 136 has an angle 142 of departure from the horizontal 151. If the lower surface of the shelf is angled down towards the portion of the first surface of the rigid support residing thereunder, the angle of departure from the horizontal is typically greater than 0° and less than 90°, e.g., from 0.5° to 20° and preferably from 1° and 10°.

With regard to the portion of the first surface of the rigid support residing under the shelf of the locking device, the term "angled-up" means the angle of departure of the surface portion from the horizontal. With reference to FIG. 11, surface portion 139 has an angle 145 of departure from the horizontal 148. If the portion of the first surface of the rigid support residing under the shelf of the locking device is angled up toward the lower surface of the shelf, the angle of departure from the horizontal is typically greater than 0° and less than 90°, e.g., from 0.5° to 20° and preferably from 1° and 10°.

With reference to FIG. 2, open end 59 of tapered slot 62 typically has a height of from 0.15 mm to 0.3 mm, preferably from 0.2 mm to 0.25 mm, and more preferably from 0.18 mm to 0.23 mm. Closed end 56 may have a height of from zero to 0.3 mm, preferably from 0.25 mm to 0.3 mm, and more preferably from 0.2 mm to 0.25 mm. In FIGS. 2, 9,10 and 11, closed end 56 is depicted as being flat. Closed end 56 may have any suitable configuration, for example, it may be arcuate.

Tapered slots, 62, 124 and 133 of FIGS. 2, 9, 10 and 11 may be formed by mechanical means, e.g., by means of machining of one or both surfaces (e.g., surfaces 50 and/or 53). When the locking device and/or the rigid support are fabricated from thermoplastic material, the surfaces that define the tapered slot are preferably configured (or angled) during the molding process.

Locking device 41 may be fabricated from materials including, but not limited to, glass, plastic and metal. Locking device 41 may have a unitary (or substantially continuous) structure, or it may fabricated from a plurality of (e.g., at least 2) separate components. Preferably, locking device 41 has a unitary (or substantially continuous) structure. Typically, locking device 41 is fabricated from thermoplastic or thermoset plastic materials. Preferably, locking device 41 is fabricated from a thermoplastic material selected from thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and thermoplastic compositions containing one or more thereof.

In an embodiment of the present invention, the thermoplastic material of locking device 41 is reinforced with a material selected from glass fibers, carbon fibers, metal fibers, polyamide fibers and mixtures thereof. Reinforcing materials, such as glass fibers, are typically treated with a sizing to enhance their incorporation and compatibility with the thermoplastic material. If used, the reinforcement material, e.g., glass fibers, is typically present in the thermoplastic materials of locking device 41 in a reinforcing amount, e.g., in an amount of from 5 percent by weight to 60 percent by weight, based on the total weight of locking device 41.

With reference to FIG. 2, shelf 44 of locking device 41 has a closed side that may optionally include a ramp 65 that is substantially opposite from open end 59 of tapered slot 62. Ramp 65 is angled down from upper surface 45 of shelf 44 to first surface 32 of rigid support 29. Ramp 65 facilitates the removal of thin film data storage carrier 11 from locking device 41 and rigid support 29. For purposes of illustration, as data storage carrier 11 is rotated, e.g., clockwise, and tabs 23 and 26 are turned out of slots 62 and 62', a portion of data storage carrier 11 defining aperture 20 slides up ramp 65 onto upper surface 45 of shelf 44, which serves to concurrently lift or raise at least a portion of second surface 17 of data storage carrier 11 up off of first surface 32 of rigid support 29.

With reference to ramp 65, the term "angled down" refers to the angle of departure of the ramp from the horizontal, e.g., relative to the upper surface of the shelf. With reference to FIG. 11, ramp 65 has an angle 154 of departure from the horizontal 157. The angle of departure 154 from the horizontal 157 of ramp 65 is typically greater than 0° and less than 90°, e.g., from 20° to 60° and preferably from 30° to 45°.

Rigid support 29 is preferably fabricated from a material that is transparent to a laser beam, e.g., the laser beam of a digital accessing apparatus. Digital accessing appartae include, but are not limited to compact disc players, rewritable compact disc players, video disc players and DVD players. Such laser beam transparent materials include, for example, thermoplastic polymer, inorganic glass, and combinations thereof. Preferably, rigid support 29 is fabricated from a thermoplastic polymer selected from: polycarbonate; polyethylene-terephthalate; polystyrene; polyurethane elastomers; graft copolymers prepared from monomers comprising styrene and a diene rubber; cyclic polyolefins; acrylic polymers; and combinations thereof.

Rigid support 29 may optionally be both fabricated from a thermoplastic material and dimensioned to act as a lens that serves to focus a laser beam, e.g., the laser beam of a digital accessing apparatus, onto second surface 17 of data storage carrier 11, in accordance with art-recognized methods. Rigid support 29 typically has a thickness of from 1.04 mm to 1.09 mm, e.g., a thickness of 1.06 mm. Rigid support 29 may have any suitable configuration, e.g., circular, elliptical, square, rectangular or polygonal (e.g., pentagonal and higher). Preferably, rigid support 29 has a substantially circular configuration, e.g., having a diameter of 12 cm.

Figure 6:
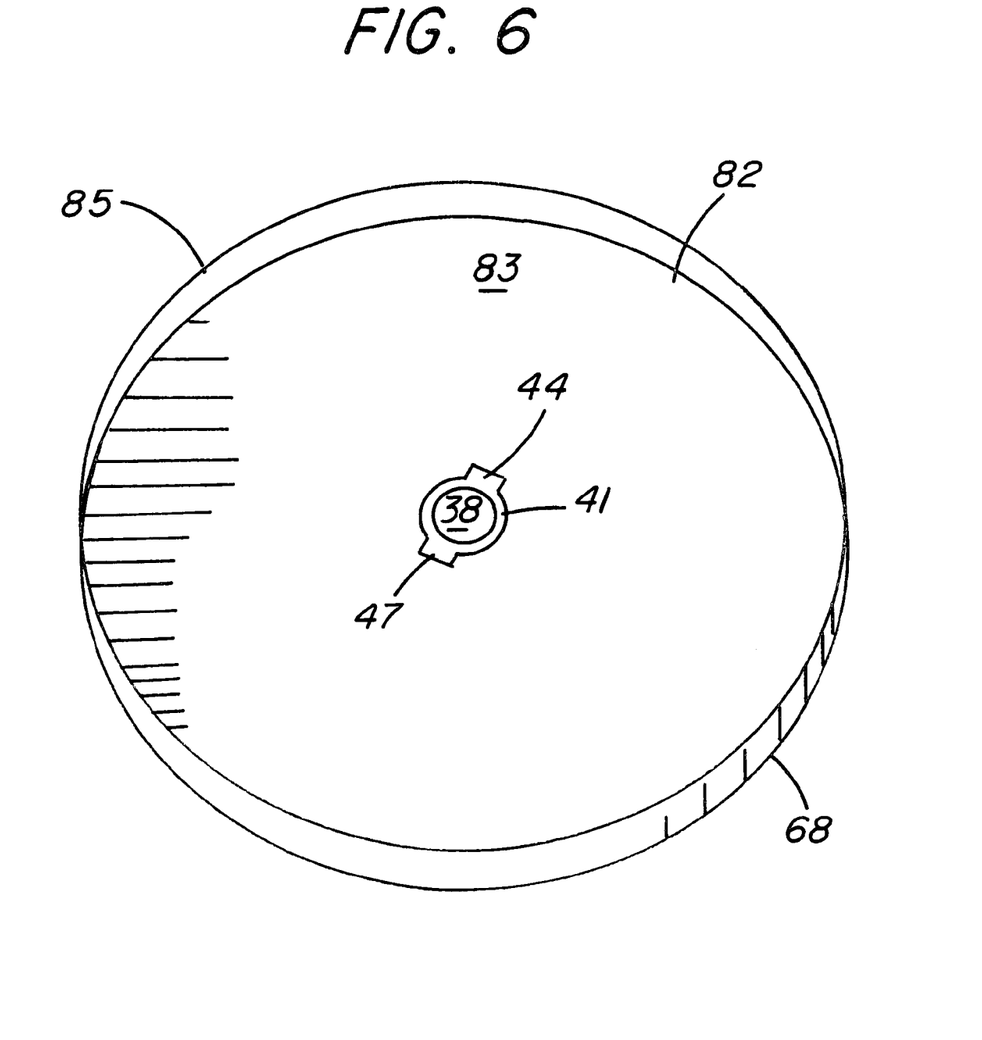
FIG. 6 is a representative perspective view of a rigid support according to the present invention that has a recessed area for receiving a thin film data storage carrier (not shown)

With reference to FIG. 6, rigid support 68 has a recessed area 83. Recessed area 83 is defined in part by at least a portion of first surface 82 of rigid support 68. Recessed area 83 is further defined by side wail 85. Recessed area 83 is sized (or dimensioned) to reversibly receive thin film data storage carrier 11. Aperture 38 of rigid support 68, and locking device 41 associated therewith, are both located within recessed area 83. Such a recessed configuration serves to minimize the occurrence of air being driven between second surface 17 of data storage carrier 11 and first surface 82 of rigid support 68 during spinning of the assembly by the spindle drive of a disc drive system. Air being driven between these surfaces can result in lifting (or flapping) of data storage carrier 11 up off of the rigid support, resulting in, for example, interruption of optical digital reading of the data storage carrier.

When both fabricated from thermoplastic material, rigid support 29 and locking device 41 may be formed together as a single continuous article by means of art-recognized injection molding processes, e.g., single injection or multi-injection molding processes. Typically, rigid support 29 and locking device 41 are formed separately, e.g., each being formed by means of injection molding, and then fixed to one another in a subsequent step. Fixing of locking device 41 to rigid support 29 may be achieved by art-recognized methods which include, but are not limited to, the use of adhesives and high frequency thermoplastic welding techniques.

Thin film data storage carrier 11 is preferably a thin film flexible data storage carrier. As used herein and in the claims, the terms "flexible" (with regard to the thin film data storage carrier) and "rigid" (with regard to the rigid support) are relative to each other. That is, the rigid support is more rigid than the flexible thin film data storage carrier, and correspondingly, the flexible thin film data storage carrier is more flexible than the rigid support. The rigid support typically has a rigidity similar to that of a rigid compact disk fabricated from thermoplastic polycarbonate and having a thickness of 1.2 mm. Generally, a sheet of thermoplastic polycarbonate having a thickness of less than or equal to 0.6 mm, e.g., 0.2 mm, is considered to be flexible, and a sheet of thermoplastic polycarbonate having a thickness of greater than 0.6 mm, e.g., 1.2 mm, is considered to be rigid.

The thin film data storage carrier 11 may be selected from, for example, thin film compact discs, thin film rewritable compact discs, thin film video discs and thin film DVD discs. Thin film data storage carrier 11 includes at least one layer of a thermoplastic material selected independently from polycarbonate, polyethylene-terephthalate; polystyrene; graft copolymers prepared from monomers comprising styrene and a diene rubber; cyclic polyolefins; acrylic polymers; and combinations thereof. Preferably, thin film data storage carrier 11 has a single thermoplastic layer of thermoplastic polycarbonate.

Thin film data storage carrier 11 may be fabricated by means of art-recognized methods. In the case of a thin film compact disc, typically a single layer thermoplastic sheet, e.g., a sheet of thermoplastic polycarbonate, is drawn continuously off of a roll thereof, and is then brought into contact with a cylindrical microembossing roll. The microembossing roll is generally fabricated from metal, and has microembossing features etched into its surface. Digital data is microembossed onto the thermoplastic sheet upon contact with the microembossing roll. The thermoplastic sheet may be metalized (e.g., with aluminum and by means of art-recognized vacuum sputtering techniques) either before or after the microembossing step (preferably after). A protective coating, e.g., a hard-coat, is then typically applied to the microembossed surface of the thermoplastic sheet. Printing of the plastic sheet may optionally be performed next, followed by additional optional coating steps. In the next step, the thin film data storage carrier 11 is removed from the plastic sheet by means of a die cut removal operation, and then optionally packaged for distribution. Die cut formation of aperture 20 and tabs 23 and 26 may be performed prior to, concurrent with or subsequent to the die cut removal operation.

Thin film data storage carrier 11 may have a configuration selected from, for example, circular, elliptical, rectangular, square and polygonal (e.g., pentagonal and higher). Preferably, thin film data storage carrier 11 is substantially circular, e.g., having a diameter of 12 cm. The thickness of thin film data storage carrier 11 can vary widely. Typically, thin film data storage carrier 11 has a thickness of from 0.1 mm to 0.3 mm, preferably from 0.15 mm to 0.25 mm, and more preferably from 0.18 mm to 0.2 mm.

In an embodiment of the present invention, when the digital data assembly is assembled, the substantially aligned apertures (20 and 38) of thin film data storage carrier 11 and rigid support 29 are each sized to reversibly receive a spindle drive of a disc drive system (not shown) selected from, for example, compact disc players, rewritable compact disc players, video disc players and DVD disc players.

Figure 3:
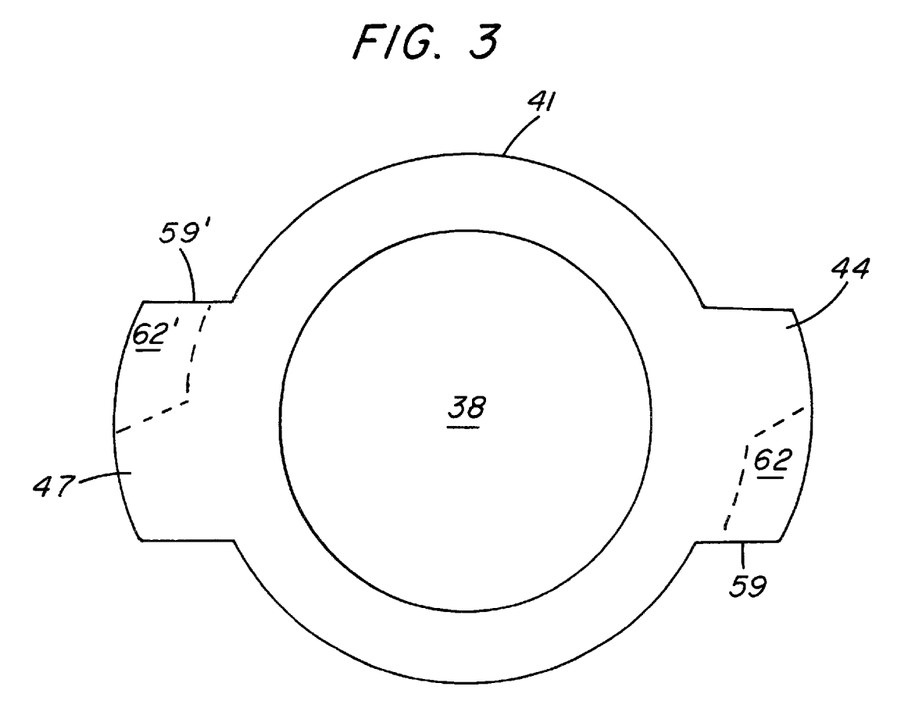
FIG. 3 is a representative top-down view of a locking device according to the present invention.
Figure 4:
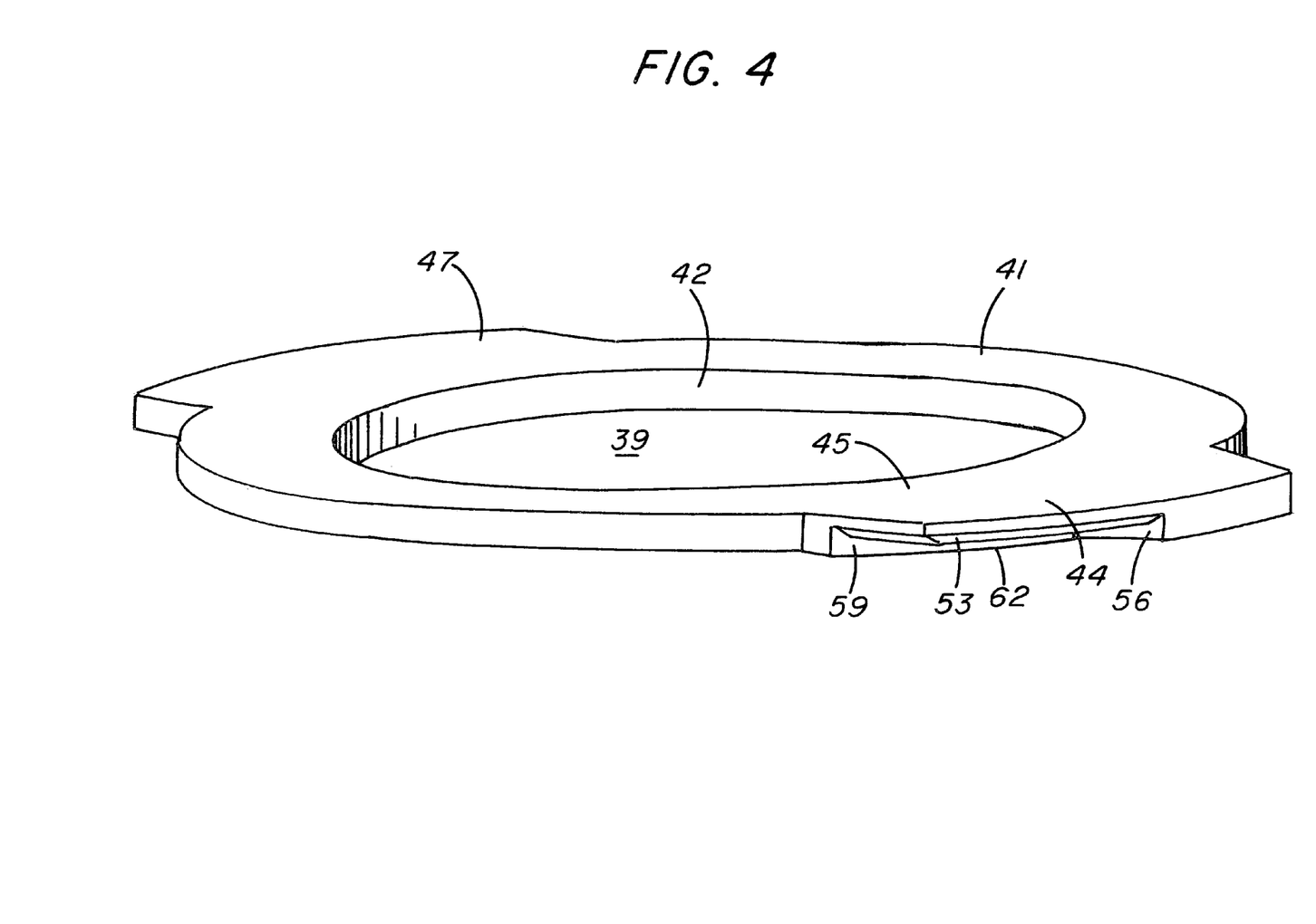
FIG. 4, is a representative perspective view of a locking device according to the present invention.

In a particularly preferred embodiment of the present invention, and with further reference to FIGS. 1 and 3, aperture 38 of rigid support 29 is substantially circular, and aperture 20 of thin film data storage carrier 11 is sized to fit around both of aperture 38 and locking device 41. Thin film data storage carrier 11 has two tabs 23 and 26 extending partially into aperture 20 of data storage carrier 11. Tabs 23 and 26 are positioned substantially 180° one from the other. Alternatively, data carrier 88 of FIG. 7 having tabs 98 and 95 positioned substantially 180° from each other could be used. Further alternatively, data carrier 111 of FIG. 8 having tabs 118 and 121 positioned substantially 180° from each other could be used. Locking device 41 has two tapered annular slots (62 and 62') positioned substantially 180° one from the other. The open ends 59 and 59' of tapered annular slots 62 and 62' are offset one from the other such that tabs 23 and 26 are each reversibly received and reversibly fixed into annular tapered slots 62 and 62' by means of rotating (e.g., manually) thin film data storage carrier 11 around locking device 41.

With reference to FIG. 3, tapered annular slots 62 and 62' are positioned relative to each other, such that tabs 23 and 26 are reversibly and fixedly received within the slots by means of a counter clockwise rotation of data storage carrier 11 around locking device 41. Such a configuration of slots 62 and 62' is particularly desirable when data storage assembly 2 is itself spun clockwise within a digital accessing apparatus, and serves to keep tabs 23 and 26 fixed within slots 62 and 62'.

With reference to FIGS. 1 and 2, the present invention also provides a thin film data storage carrier support 5. Support 5 includes a rigid support 29 having substantially opposed first 32 and second 35 surfaces (i.e., substantially parallel first 32 and second 35 surfaces), and having an aperture 38. Support 5 also includes a locking device 41 positioned at least partially around aperture 38 of rigid support 29. Locking device 41 includes at least one shelf (44 and 47) extending out over a portion of the first surface 32 of rigid support 29. Shelf 44, for example, has an upper surface 45 and a lower surface 50. A portion 53 of first surface 32 of rigid support 29 resides under shelf 44. Lower surface 50 of shelf 44 and portion 53 of first surface 32 of rigid support 29 residing under shelf 44 together define a tapered slot 62. Tapered slot 62 has an open end 59 and a closed end 56. As described previously herein, tapered slot 62 is dimensioned to reversibly receive and reversibly fix a tab (e.g., 23 or 26) of thin film data storage carrier 11.

Rigid support 29 and locking device 41 of thin film data storage carrier support 5 are each as described previously herein. Thin film data storage carrier 11 is as described previously herein.

With reference to FIG. 7, the present invention also provides a thin film data storage carrier 88 having a cruciform aperture 91 therein. Cruciform aperture 91 may be defined in part by two pairs of substantially opposed and substantially straight lines (or substantially opposed terminal straight sides), 94 and 94', and 97 and 97'. Data storage carrier 88 also includes at least one tab (98 and 95) extending partially into cruciform aperture 91.

With reference to FIG. 8, the present invention also provides a thin film data storage carrier 111 having cruciform aperture 114 that is defined in part by two pairs of substantially opposed arcuate sides (or substantially opposed terminal arcuate sides), 117 and 117', and 120 and 120'. Cruciform aperture 114 includes at least one tab (118 and 121) extending partially into cruciform aperture 114. In FIGS. 7 and 8, tabs 95 and 98, and tabs 118 and 121 each have a shape that is substantially triangular (though other configurations may be used, e.g., arcuate, square and rectangular). Thin film data storage carriers having cruciform apertures (such as cruciform apertures 91 and 114 of FIGS. 7 and 8) have been found to provide great ease by which the tabs thereof (e.g., tabs 98 and 95; or tabs 118 and 121 ) are reversibly received and fixed within tapered slots 62 and 62'.

The present invention has been described with reference to specific details of particular embodiments thereof. It is not intended that such details be regarded as limitations upon the scope of the invention except insofar as and to the extent that they are included in the accompanying claims.

What is claimed is:

1. A digital data storage assembly comprising:
   (a) a thin film data storage carrier, having substantially opposed first and second surfaces, having an aperture, and having at least one tab extending partially into said aperture;
   (b) a rigid support having substantially opposed first and second surfaces, and having an aperture; and
   (c) a locking device positioned at least partially around said aperture of rigid support, said locking device comprising at least one shelf extending out over a portion of the first surface of said rigid support, said shelf having an upper surface and a lower surface, a portion of the first surface of said rigid support residing under said shelf, the lower surface of said shelf and said portion of said first surface of said rigid support residing under said shelf together defining a tapered slot dimensioned to reversibly receive and reversibly fix the tab of said thin film data storage carrier, said tapered slot having an open end and a closed end,
   wherein the second surface of said thin film data storage carrier abuts at least a portion of the first surface of said rigid support, the aperture of said thin film data storage carrier (a), and the aperture of said rigid support (b) are substantially aligned, and said thin film data storage carrier is reversibly fixed to said rigid support by means of the tab of said thin film data storage carrier being reversibly received within said tapered slot.

2. The digital data storage assembly of claim 1 wherein the aperture of said rigid support is substantially circular, the shelf of said locking device is an annular shelf, and said tapered slot is an annular tapered slot.

3. The digital data storage assembly of claim 1 wherein said tapered slot is defined by the lower surface of said shelf being angled down towards said portion of said first surface of said rigid support residing under said shelf, and said portion of said first surface of said rigid support residing under said shelf is substantially planar.

4. The digital data storage assembly of claim 1 wherein said tapered slot is defined by the lower surface of said shelf being substantially planar, and said portion of said first surface of said rigid support residing under said shelf is angled up towards the lower surface of said shelf.

5. The digital data storage assembly of claim 1 wherein said tapered slot is defined by the lower surface of said shelf being angled down towards said portion of said first surface of said rigid support residing under said shelf, and said portion of said first surface of said rigid support residing under said shelf is angled up towards the lower surface of said shelf.

6. The digital data storage assembly of claim 1 wherein said rigid support has a recessed area, said recessed area being defined by at least a portion of the first surface of said rigid support, said recessed area being sized to reversibly receive said thin film data storage carrier (a), and the aperture of said rigid support being located within said recessed area.

7. The digital data storage assembly of claim 1 wherein said thin film data storage carrier is a flexible thin film data storage carrier.

8. The digital data storage assembly of claim 1 wherein the substantially aligned apertures of said thin film data storage carrier (a) and said rigid support (b) are each sized to reversibly receive a spindle drive of a disc drive system selected from the group consisting of compact disc players, rewritable compact disc players, video disc players and DVD disc players.

9. The digital data storage assembly of claim 1 wherein said thin film data storage carrier (a) is selected from the group consisting of thin film compact discs, thin film rewritable compact discs, thin film video discs and thin film DVD discs.

10. The digital data storage assembly of claim 1 wherein said rigid support (b) is fabricated from a material that is transparent to a laser beam of a digital accessing apparatus, said material being selected from the group consisting of thermoplastic polymer, inorganic glass, and combinations thereof.

11. The digital data storage assembly of claim 10 wherein said digital accessing apparatus is selected from the group consisting of compact disc players, rewritable compact disc players, video disc players and DVD players.

12. The digital data storage assembly of claim 10 wherein said rigid support (b) is both fabricated from a thermoplastic material and dimensioned to act as a lens that focuses said laser beam onto the second surface of said thin film data storage carrier.

13. The digital data storage assembly of claim 10 wherein said rigid support (b) is fabricated from a thermoplastic polymer selected from the group consisting of: polycarbonate; polyethylene-terephthalate polystyrene; polyurethane elastomers; graft copolymers prepared from monomers comprising styrene and a diene rubber; cyclic polyolefins; acrylic polymers; and combinations thereof.

14. The digital data storage assembly of claim 1 wherein said thin film data storage carrier (a) comprises at least one layer of a thermoplastic material selected independently from the group consisting of polycarbonate, polyethylene-terephthalate; polystyrene; graft copolymers prepared from monomers comprising styrene and a diene rubber; cyclic polyolefins; acrylic polymers; and combinations thereof.

15. The digital data storage assembly of claim 1 wherein said locking device (c) is fabricated from a thermoplastic material selected from a member of the group consisting of thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and thermoplastic compositions containing one or more thereof.

16. The digital data storage assembly of claim 15 wherein said locking device (c) is reinforced with a material selected from glass fibers, carbon fibers, metal fibers, polyamide fibers and mixtures thereof.

17. The digital data storage assembly of claim 1 wherein the aperture of said rigid support (b) is substantially circular, the aperture of said thin film data storage carrier (a) is sized to fit around the aperture of said rigid support (b) and around said locking device (c), said thin film data storage carrier (a) has two tabs extending partially into the aperture of said data storage carrier, the tabs being positioned substantially 180° one from the other, said locking device (c) has two tapered annular slots positioned substantially 180° one from the other, the open ends of each tapered annular slot being offset one from the other such that the tabs are each reversibly received and reversibly fixed into the annular tapered slots by means of rotating said thin film data storage carrier (a) around said locking device (c).

18. The digital data storage assembly of claim 1 wherein said shelf of said locking device has a closed side that is substantially opposite from the open end of said tapered slot, said closed side of said shelf comprising a ramp that is angled down from the upper surface of said shelf to the first surface of said rigid support.

19. The digital data storage assembly of claim 1 wherein the aperture of said thin film data storage carrier (a) is a cruciform aperture.

20. The digital data storage assembly of claim 19 wherein said cruciform aperture is defined in part by two pairs of substantially opposed arcuate sides.

21. A thin film data storage carrier support comprising:

(i) a rigid support having substantially opposed first and second surfaces, and having an aperture; and (ii) a locking device positioned at least partially around said aperture of said rigid support, said locking device comprising at least one shelf extending out over a portion of the first surface of said rigid support, said shelf having an upper surface and a lower surface, a portion of the first surface of said rigid support residing under said shelf, the lower surface of said shelf and said portion of said first surface of said rigid support residing under said shelf together defining a tapered slot, said tapered slot having an open end and a closed end, wherein said tapered slot is dimensioned to reversibly receive and reversibly fix a tab of a thin film data storage carrier, said thin film data storage carrier having substantially opposed first and second surfaces, having an aperture, and having at least one tab extending partially into said aperture of said thin film data carrier, the second surface of said thin film data storage carrier abutting at least a portion of the first surface of said rigid support when said tab is reversibly received and fixed within said tapered slot.

22. The thin film data storage carrier support of claim 21 wherein the aperture of said rigid support is substantially circular, the shelf of said locking device is an annular shelf, and said tapered slot is an annular tapered slot.

23. The thin film data storage carrier support of claim 21 wherein said tapered slot is defined by the lower surface of said shelf being angled down towards said portion of said first surface of said rigid support residing under said shelf, and said portion of said first surface of said rigid support residing under said shelf is substantially planar.

24. The thin film data storage carrier support of claim 21 wherein said tapered slot is defined by the lower surface of said shelf being substantially planar, and said portion of said first surface of said rigid support residing under said shelf is angled up towards the lower surface of said shelf.

25. The thin film data storage carrier support of claim 21 wherein said tapered slot is defined by the lower surface of said shelf being angled down towards said portion of said first surface of said rigid support residing under said shelf, and said portion of said first surface of said rigid support residing under said shelf is angled up towards the lower surface of said shelf.

26. The thin film data storage carrier support of claim 21 wherein said rigid support is fabricated from a thermoplastic material that is transparent to a laser beam of a digital accessing apparatus.

27. The thin film data storage carrier support of claim 26 wherein said rigid support is both fabricated from a thermoplastic material and dimensioned to act as a lens that focuses said laser beam onto the second surface of said thin film data storage carrier.

* * * * *